(12) United States Patent
Griffith et al.

(10) Patent No.: US 6,178,653 B1
(45) Date of Patent: Jan. 30, 2001

(54) PROBE TIP LOCATOR

(75) Inventors: Joseph Edward Griffith, Berkeley Heights, NJ (US); Charles E. Bryson, III, Sunnyvale, CA (US); Jeffrey Bruce Bindell, Orlando, FL (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/196,827

(22) Filed: Nov. 20, 1998

(51) Int. Cl.$^7$ .............................. G01B 9/00; G01B 5/00
(52) U.S. Cl. .................. 33/555; 33/502; 33/706
(58) Field of Search .................. 33/555, 502, 503, 33/706, 707, 708, 1 BB

(56) References Cited

U.S. PATENT DOCUMENTS

| | | | |
|---|---|---|---|
| 3,600,811 | * 8/1971 | Weyrauch | 33/707 |
| 3,916,528 | * 11/1975 | Eisenkopf | 33/706 |
| 4,409,479 | * 10/1983 | Sprague et al. | 33/707 |
| 4,530,159 | * 7/1985 | Ernst | 33/707 |

\* cited by examiner

*Primary Examiner*—Christopher W. Fulton
(74) *Attorney, Agent, or Firm*—Stroock & Stroock & Lavan LLP

(57) ABSTRACT

A probe tip locator for use in determining the x-axis location and y-axis location of a probe tip of a microscope relative to the locator, the locator comprising a plurality of first reference lines parallel in a first direction, each of the first reference lines representing a predetermined x-axis location of the probe tip; a plurality of sets of parallel encoded bit fields, each one of the sets corresponding to one of the first reference lines; and a plurality of second reference lines parallel in a second direction, each one of the second reference lines intersecting at least one of the first reference lines at an acute angle, such that a scan of a portion of the locator is used to determine the x-axis location and y-axis location of the probe tip relative to the probe tip locator by movement of the probe tip relative to the probe tip locator.

32 Claims, 6 Drawing Sheets

PROBE TIP LOCATOR

FIELD OF THE INVENTION

This invention relates to a probe tip locator, and, in particular, to probe tip locator having a plurality of encoded bit fields for use with a scanning probe or stylus microscope.

BACKGROUND OF THE INVENTION

Before a probe can be used to scan a sample, its position relative to the x-y stage on which the sample is mounted must be known. The microscope generally knows the location of the probe tip within an initial level of uncertainty (a). In prior art microscopes, the initial level of uncertainty (a) can be large. The level of uncertainty (a) should, however, correspond to the precision of the stage, which is generally a few microns. A probe tip locator is used to more precisely determine the location of the probe tip, i.e., reduce the level of uncertainty (a) to an acceptable target value. The probe tip locator is placed at a predetermined location on the stage. The locator is designed so that a scan of the locator will provide information about the position of the probe over the locator. Using this information, the position of the probe tip relative to the microscope stage and scan actuator can be determined.

BACKGROUND OF THE INVENTION

The prior art probe tip locators typically use a single large locator. The prior art locator generally consists of a first reference line parallel to the y-axis and a second reference line which intersects the first reference line at an acute angle. A scan line which crosses the two reference lines is used to calculate the location of the probe tip. That is, by using a known offset vector, a scan of the first reference line is used to determine the x-axis location of the probe tip and the distance between the two scanned lines, along the scan line, is used to determine the y-axis location. That is, a scan line across the entire locator is needed to determine the location of the probe tip. The limits of the prior art locators is the scanning range (b). That is, in the prior art, a single scan of a distance b will reveal the location of the probe tip relative to the probe's coordinate system. One of skill in the art will recognize that when the scan range of the probe (b) is significantly smaller than the initial uncertainty of the probe position (a), the prior art locators are not useful because a scan across the entire area occupied by the locator is required in order to reveal the location of the probe tip.

SUMMARY OF THE INVENTION

The present invention is directed to a probe tip locator for use with a scanning probe or stylus microscope, and in particular, the present invention is directed at a probe tip locator for locating a probe tip when the microscope scan range is smaller than the needed capture range.

In a preferred embodiment, the locator generally includes an array of scannable structures. Each structure includes a first reference line parallel to the y-axis of the stage coordinate system and a second reference line which is angled from and intersects the first reference line at an acute angle. Each structure also includes an encoding scheme comprising a plurality of encoded bit fields which are parallel to the first reference line. Each encoding scheme comprises 4 neighboring lines forming a 4 bit field, allowing for the encoding and identification of 16 distinct first reference lines. A scan across just a portion of the locator, i.e., a scan which includes a first reference line, a second reference line, and at least four neighboring lines, whether from the same bit field or adjacent bit fields, is all that is needed to locate the probe tip. The microscope uses the encoded bit fields to determine which of the first reference lines has been scanned. If the scan includes neighboring lines from two adjacent bit fields, an algorithm is employed to determine which first reference line was scanned. By using this information, and a known offset vector, the x-axis location of the probe tip relative to the stage coordinate system can be determined. The y-axis location of the probe tip relative to the stage coordinate system is determined by measuring the distance between the first scanned reference line and the scanned second reference line.

In another preferred embodiment, the locator generally includes a plurality of reference lines parallel to the y-axis. Between each reference line is a first encoding scheme comprising 4 neighboring lines forming a 4 bit field, allowing for the identification of 16 distinct first reference lines. The locator also includes a second encoding scheme between the reference lines comprising 8 neighboring lines forming an 8 bit field, which encodes a total of 256 distinct positions along the y-axis between each reference line. A scan across just a portion of the locator, i.e., a scan which includes a reference line, at least four neighboring lines from a first encoding scheme, and at least eight neighboring lines from a second encoding scheme, whether the neighboring lines are from the same bit field or adjacent bit fields, is all that is needed to locate the probe tip. The microscope uses the encoded bit fields to determine which of the first reference lines has been scanned. Accordingly, a scan across just a portion of the locator is all that is required to reveal the location of the probe tip relative to the x-y stage.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

Figure 1:
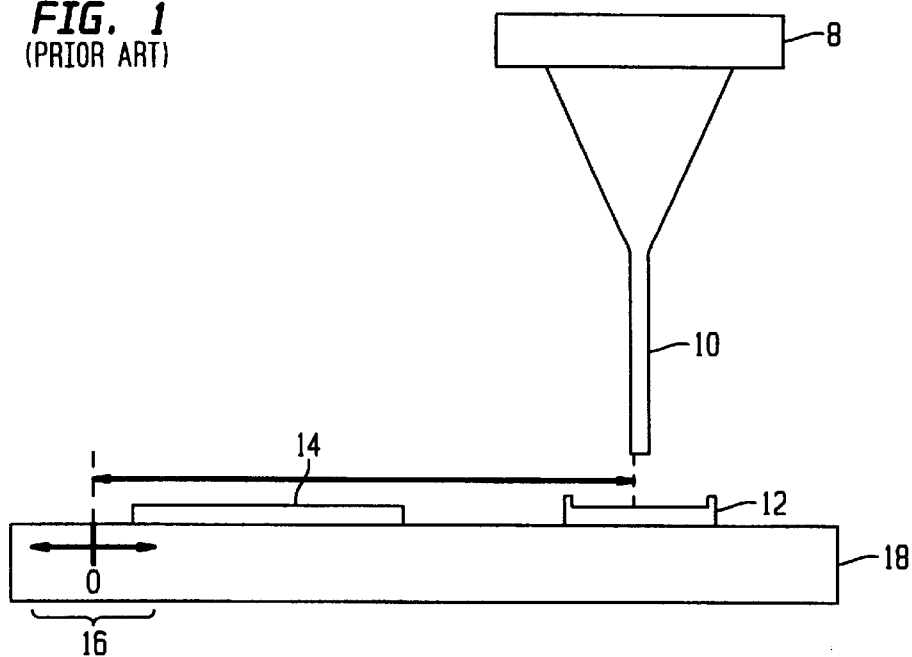
FIG. 1 is a side elevational view of a probe tip mounted on a microscope above a probe tip locator mounted on a stage and constructed in accordance with the prior art.

In navigating to a predetermined location on a sample with a scanning probe or stylus microscope, it is important to know the location of the probe tip with respect to the sample stage and/or with respect to the scan actuator. However, as seen in FIG. 1, when the probe tip 10 is mounted on a microscope (not shown), the probe tip's location with respect to the stage coordinate system 16, the sample 14 and the scan actuator 8 is not precisely known. Ideally, the uncertainty in the probe tip location should be of the order of the precision of the stage 18, which is generally, in a preferred embodiment, a few microns. In order to move the stage 18 so that the probe tip 10 is positioned over a given location on the sample 14, it is necessary to know the position of the probe tip 10 relative to the stage's coordinate system 16. A particularly convenient way to do this is to employ a probe tip locator 12. The probe tip locator 12 is placed at a known location on the stage 18. The prior art locator 12 is designed so that a scan of the entire locator will provide information about the position of the probe tip 10 over the locator 12 and scan actuator 8. Using this information, the position of the probe tip 10 with respect to the stage 18 and the stage coordinate system 16 can be determined. Also, using this information the position of the probe tip 10 with respect to the scan actuator 8 can be determined.

Figure 2:
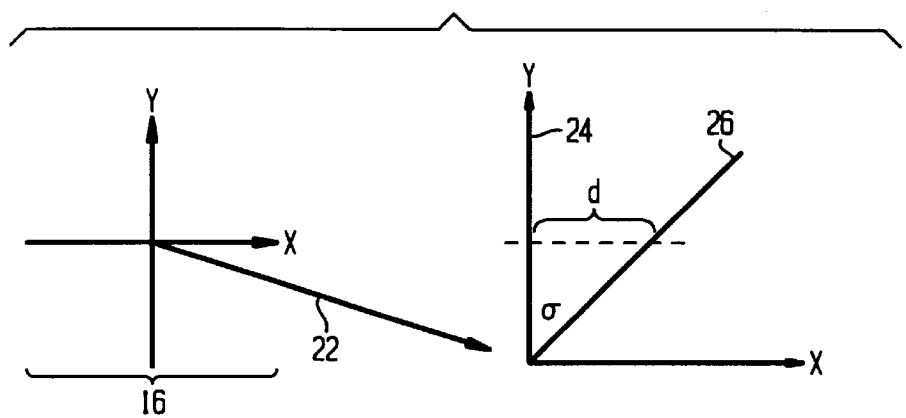
FIG. 2 is an enlarged view of a scan line taken across the probe tip locator of FIG. 1 for use in determining the x-axis and y-axis location of the probe tip relative to the stage coordinate system.

Prior art probe tip locators have generally been used with long range stylus profilers. The prior art stylus profilers typically have a very long scan range, allowing a single large probe locator to be used to locate the position of the probe tip. As seen in FIG. 2, locators generally include two reference lines 24 and 26 which intersect at a known angle θ. By scanning the locator 12 such that both lines 24 and 26 are scanned, the location of the probe tip 10 can be determined with respect to the stage coordinate system 16. That is, by using a known offset vector 22, a scan line 20 reveals the position of the probe tip 10 relative to the stage coordinate system 16. The location of the left edge 24 sets the x-axis position of the probe tip 10, and the distance d between the lines is used to calculate the y-axis position.

One of skill in the art will recognize however, that the prior art locator will not work for microscopes which use a small scan range relative to the initial uncertainty of the probe's position. Many microscopes, consequently, cannot use a single large structure to determine the probe's position and therefore must instead use an array of structures. A problem that arises is then to determine which of the structures was scanned in order to determine the probe tip's location. The present invention is directed at an encoding scheme that allows an array of small structures to be scanned. The code identifies the actual structure scanned, so that the location of that probe tip relative to the locator's can be determined.

Figure 3:
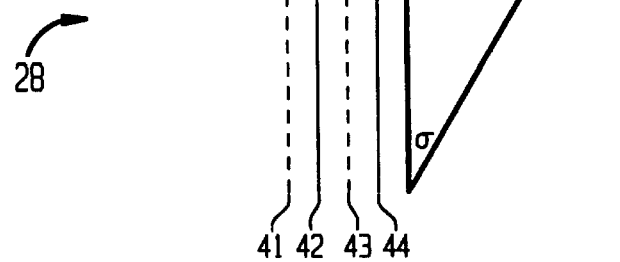
FIG. 3 is a detailed view of a portion of the probe tip locator depicted in FIG. 4.
Figure 4:
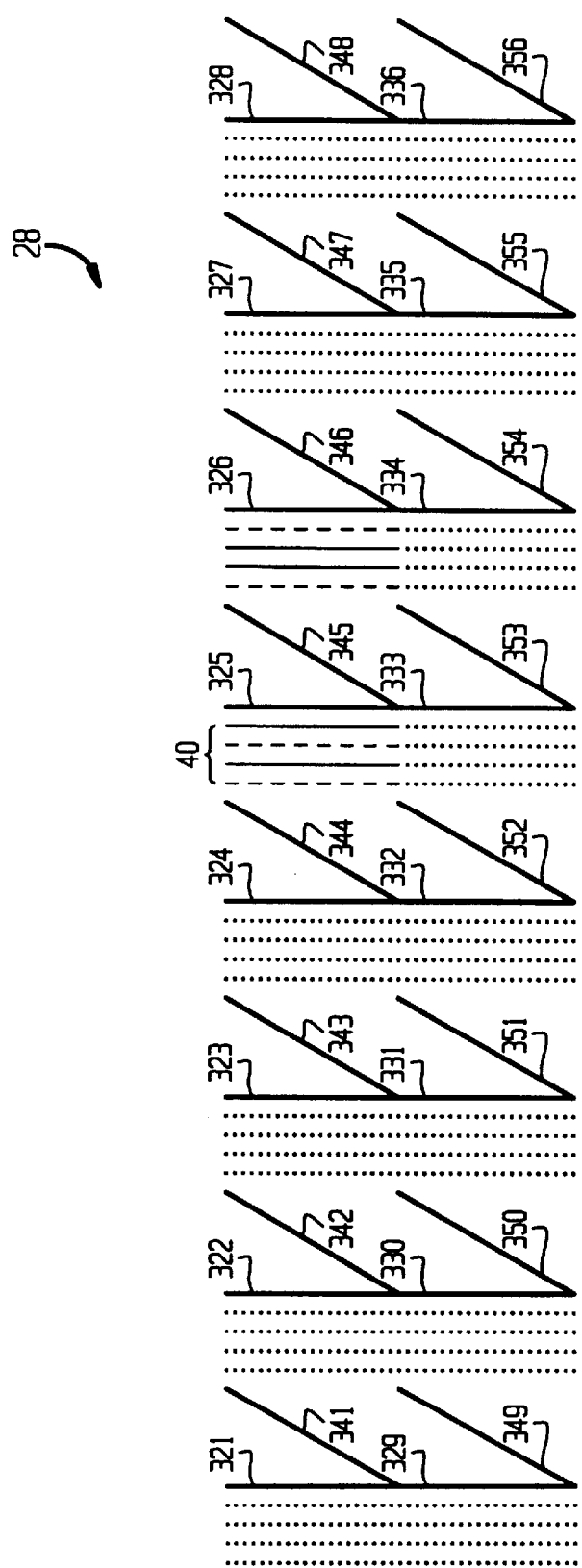
FIG. 4 is a top view of a probe tip locator constructed in accordance with a preferred embodiment of the present invention.

As seen in FIGS. 3 and 4, and in accordance with a preferred embodiment of the present invention, a probe tip locator, generally indicated as 28, is provided. The locator 28 includes an array of sixteen scannable structures employing an encoding scheme. As seen in FIG. 3, each structure generally includes a first reference line 32 parallel to the y-axis, and a second reference line 34 which is angled from first reference line 32 and intersects the first reference line 32 at an acute angle θ. Each structure also includes an encoding scheme 40 comprising four neighboring lines 41, 42, 43 and 44. In accordance with the instant invention, and by way of a non-limiting example, neighboring lines 41, 42, 43 and 44 are about 0.5 μm wide, with a 1.0 μm pitch. The neighboring lines act as bits in a 4 bit field. One of skill in the art will recognize that as used herein the term line or neighboring line denotes either the presence or absence of a line. That is, when the neighboring line is present (i.e., line 42) it denotes a 1, and when the line is absent (i.e., line 41) it denotes a 0. One of skill in the art will recognize that with such a 4 bit field, 16 distinct reference lines (i.e., lines 321–336) can be identified. Each first reference line 321–336 has a corresponding intersecting second reference line 341–356 respectively. As seen in FIG. 4, the encoding schemes for first reference lines 325 and 326 are shown. First reference line 325 has an encoded pattern of 0101 and first reference line 326 has a pattern of 0110. The encoding scheme for the remaining reference lines are not shown, but the neighboring lines are indicated by dotted lines. In accordance with the instant invention, and by way of a non-limiting example, the first reference lines, which are parallel to the y-axis, are about 1 μm wide, are spaced with a 20 μm pitch and are 40 μm long in the vertical or y direction. One of skill in the art will recognize that the thickness and length of the reference lines and the neighboring lines of the encoding scheme described above and below are merely exemplary and are in no way limiting of the present invention. That is, the present invention envisions the use of reference lines and encoding schemes of any thickness or dimensions, as a matter of design choice, without departing from the spirit of the invention. The thickness and length of the reference lines and encoding scheme of the present invention is limited only by design tolerances of the microscope system and the target precision of the system.

In accordance with the instant invention, and by way of a non-limiting example, each of the second reference lines 341–356 transverse 20 μm in the lateral, or x, direction and 40 μm in the vertical, or y, direction. Therefore, in the lateral, or x, direction, first reference line 321 and the second reference line 341 occupies about 20 μm and the bit field 40 occupies about 5 μm, for a total of 25 μm in the lateral or x direction. Each field or structure is therefore about 25 μm×40 μm, and the 16 fields cover an area of about 200 μm×80 μm. Thus, a single 25 μm scan parallel to the x-axis that lies entirely within this region, will locate the probe tip. To determine the location of the probe tip 10 relative to the stage coordinate system 16, the bit field 40 is decoded to determine which first reference line was scanned. If the scan includes neighboring lines from two adjacent bit fields, an algorithm is employed to determine which first reference line was scanned. Using this information, in a preferred embodiment, the x-axis location can be determined to within 0.5 μm. Determining the y-axis location is described below.

As seen below, the y-axis location is determined geometrically. Second reference lines 34 cover a rectangle with, by way of a non-limiting example, a 2:1 aspect ratio with respect to first reference lines 32. A scan line will cross both a first reference line 32 and a second reference line 34. The distance between the first reference line 32 and the second reference line 34 along the scan line is measured. Using this information, the unknown distance y1 is determined by measuring x1 and using the known values x0 and y0, wherein:

$$y1 = x1 * \frac{y0}{x0}$$

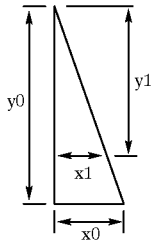

The error in y1 is simply $$\delta y1 = \delta x1 \times \frac{yo}{xo}$$

where δx1 is the uncertainty in the x1 measurement. In accordance with the instant invention, and by way of a non-limiting example, for 0.5 μm pixel spacing along x-axis, the ratio, $$\frac{yo}{xo},$$

must not be greater than 2, if the probe tip 10 is to be located along the y-axis to within 1 μm. Accordingly, in a preferred embodiment, a 25 μm scan with 0.5 μm pixel spacing will locate the probe tip 10 to within 0.5 μm along the x-axis and 1.0 μm along the y-axis.

Figure 5:
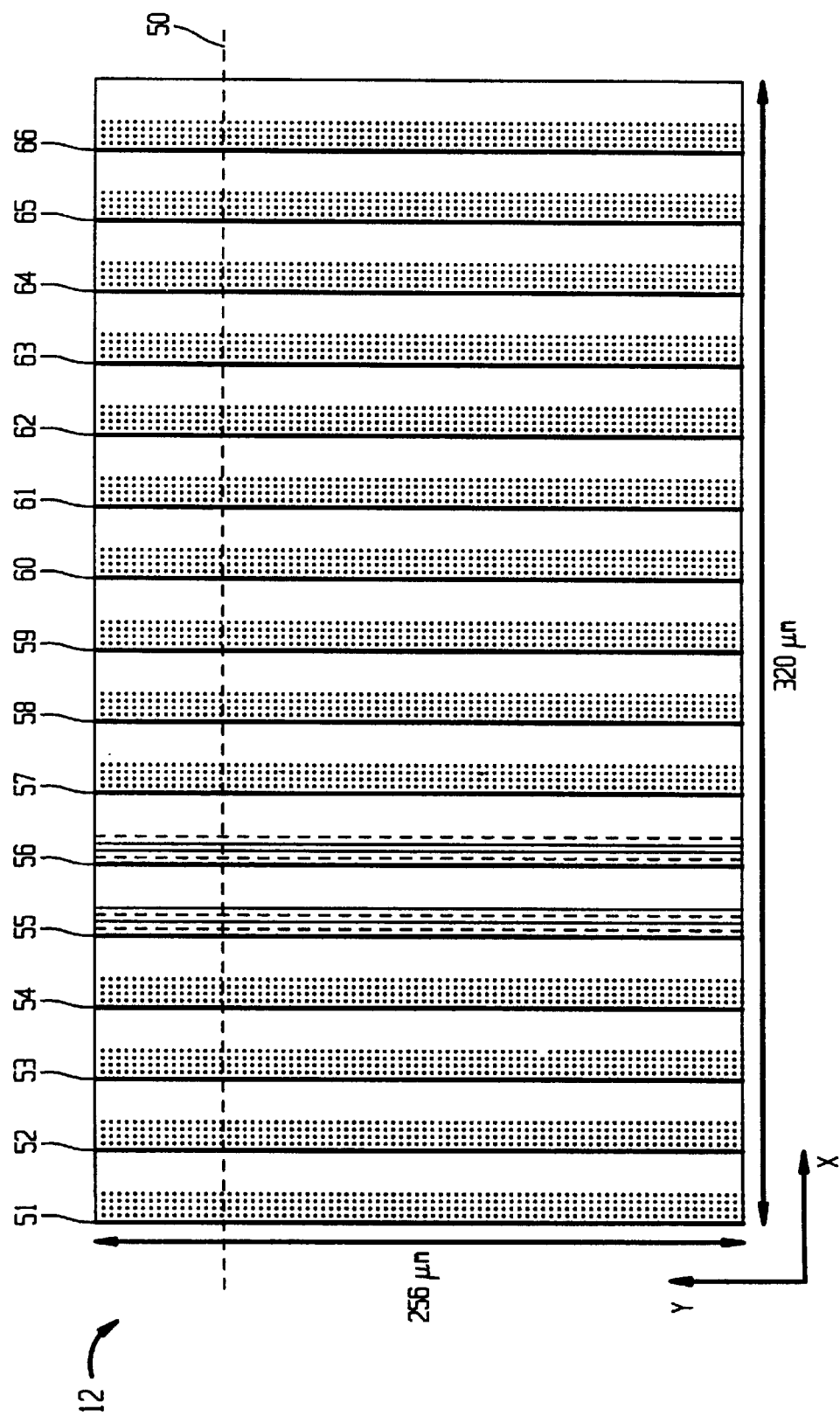
FIG. 5 is a top view of a probe tip locator constructed in accordance with another preferred embodiment of the present invention.
Figure 6:
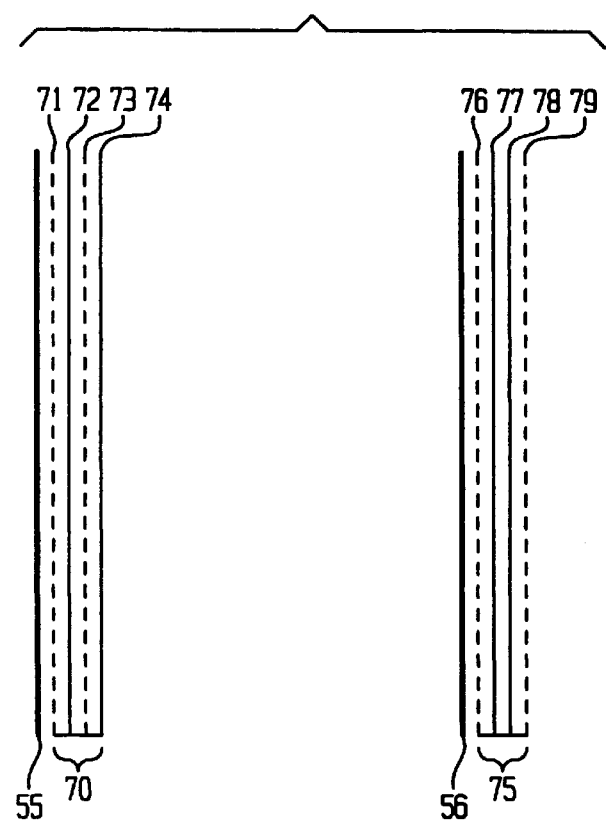
FIG. 6 is an enlarged view of reference lines 55 and 56 of FIG. 5.
Figure 7:
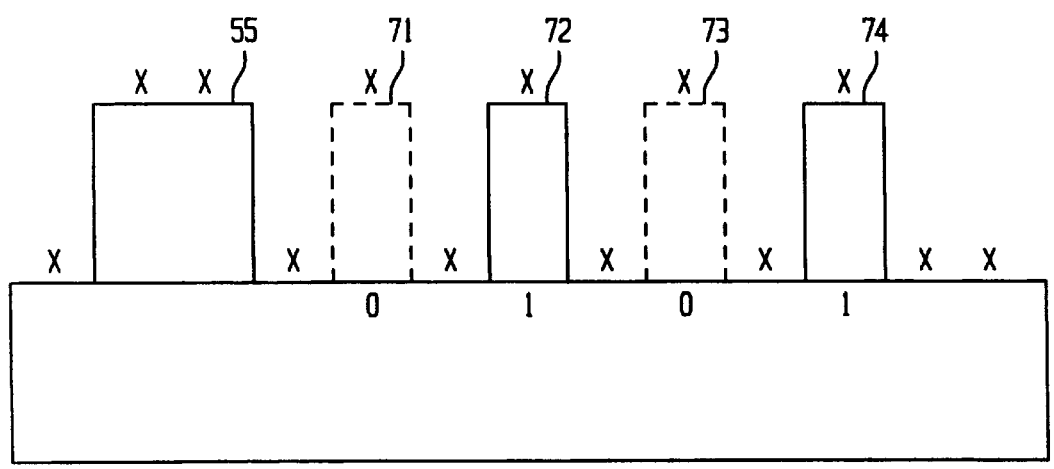
FIG. 7 is a view of a sample scan of reference line 55 of FIG. 5.

In another preferred embodiment, the encoding scheme described above is extended to cover both the x-axis and y-axis. As seen in FIG. 5, the probe tip locator 12 is provided with an array of reference lines parallel to the y-axis. In accordance with the instant invention, and by way of a non-limiting example, 16 reference lines are provided, i.e., lines 51–66, and the array of reference lines are 1 μm wide, and spaced with 20 μm pitch. A 20 μm scan within the locator 12 is therefore guaranteed to include one of these reference lines, so that the line edge can be used to find the x-axis probe position. With 0.5 μm pixel spacing, the x-axis position would be known to within 0.5 μm. For the identification, and as best seen in FIG. 6, each reference line is also accompanied by a first encoding scheme comprising four neighboring lines. For example, as seen in FIG. 6, reference line 55 has a first encoding scheme 70 comprising four neighboring lines 71, 72, 73 and 74, and reference line 56 has a first encoding scheme 75 comprising four neighboring lines 76, 77, 78 and 79. In accordance with the instant invention, and by way of a non-limiting example, the neighboring lines are 0.5 μm wide with a 1.0 μm pitch. The neighboring lines act as bits in a 4 bit field. When the neighboring line is present (i.e., line 72) it denotes a 1, and when the line is absent (i.e., line 71) it denotes a 0. With such a 4 bit field, 16 distinct reference lines can be identified. A line scan 50 (FIG. 5) used to determine the probe tip 10 location will lie parallel to the x scan axis. The pattern for reference lines 55 (0101) and 56 (0110) are shown in FIG. 6. FIG. 7 shows what a scan of line 55 of FIG. 6 would look like. A convenient height for the reference lines 51–66 would be 50 μm–100 μm. One of skill in the art will recognize that the thickness and length of the reference lines and encoding scheme described above and below are merely exemplary and are in no way limiting of the present invention. That is, the present invention envisions the use of reference lines and encoding schemes of any thickness or dimensions, as a matter of design choice, without departing from the spirit of the invention. The thickness and length of the reference lines and encoding scheme of the present invention is limited only by design tolerances of the microscope system and the target precision of the system.

It is important to note that the single line scan may not read an entire bit field. In many cases, the scan line will begin in one bit field and finish in an adjacent one. An easy algorithm allows the numbers to be deciphered from adjoining field fragments as long as at least four bits are read. In summary, the location of the probe tip 10 along the x-axis is determined by the position of the edge of the reference line in the scan. In a preferred embodiment, the pixel spacing allows that edge to be determined to with 0.5 μm. The bit fields next to the reference lines are used to determine which was scanned.

Figure 8:
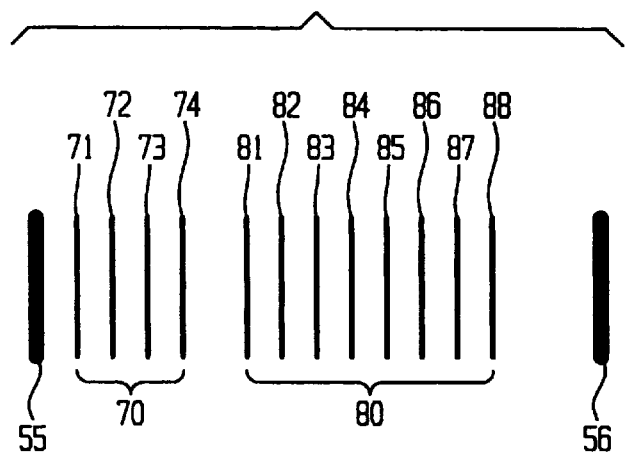
FIG. 8 is an enlarged view depicting the space between two adjacent reference lines of the probe tip locator of FIG. 5.
Figure 9:
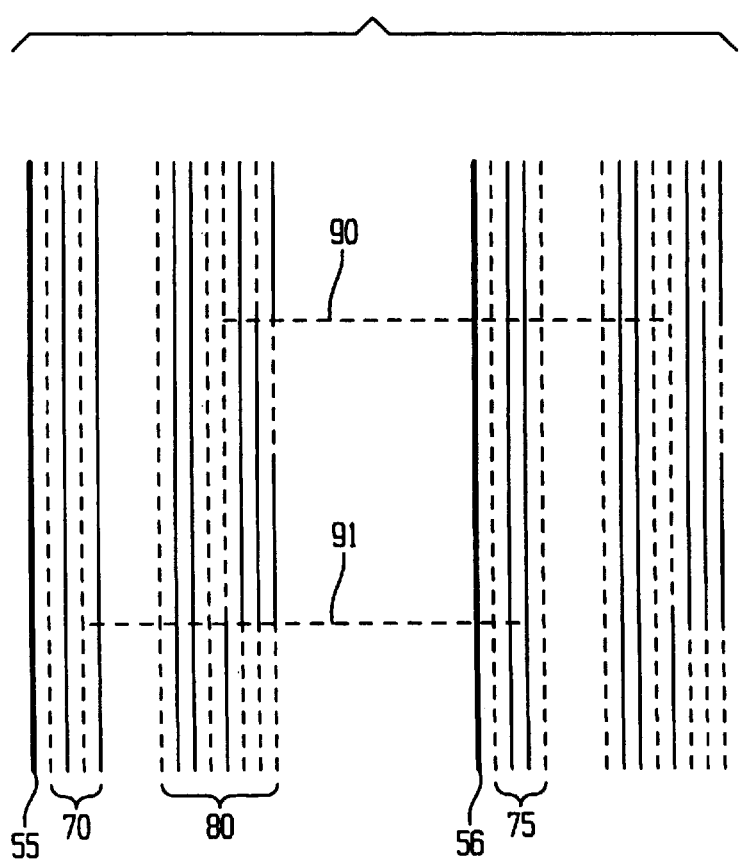
FIG. 9 is an enlarged view of the encoded bit fields between reference lines 55 and 56 of FIG. 5.
Figure 10:
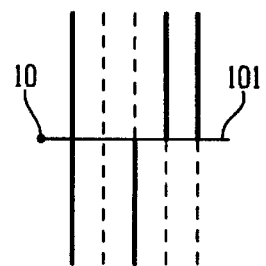
FIG. 10 is an enlarged view of a portion of the encoded bit fields of a representative probe tip locator.

As seen in the preferred embodiment of FIG. 8, of the 20 μm space between the x-axis reference lines 55 and 56, 5 μm has been used by neighboring lines 71–74. The remaining 15 μm is used for encoding the y-axis location. To accomplish this, as seen in FIGS. 9 and 10, a second bit field 80, parallel to the first bit field 70, with a total of 8 neighboring lines 81–88 is added. As before, when a neighboring line is present it denotes a 1, and when the line is absent it denotes a 0. One of skill in the art will recognize that these 8 neighboring lines can be used to encode a total of 256 positions along the y-axis in the space between two adjacent reference lines. There is room for 15 encoded lines between the reference lines, so more encoding could be added if desired, such as, for example, to provide for error correction.

One of skill in the art will recognize that, in accordance with a preferred embodiment of the present invention, with each change in the rightmost bit, the y position increments by 1 μm. Two representative scan lines 90 and 91 are shown as horizontal dashed lines in FIG. 9. As before, an easy algorithm allows the reference line to be decoded from adjoining field fragments as long as at least four x-axis bits are scanned and at least eight y-axis bits are scanned.

As seen in FIG. 10, a potential problem arises from the non-zero size of the probe tip 10, which can cause errors in the y-axis bit field decoding along certain scan lines 101. This problem can be reduced, but not completely eliminated, by putting a small space in the transitions between the y-axis field. This however is not a complete solution because the microscope finder must be capable of finding probes tips with a range of sizes. In addition, it may be preferable to include some error correcting bits, much like the parity bits used in computer memories. One of skill in the art will recognize that it is not difficult to find an error-correction code capable of handling bits that are falsely set to 1. Another solution may be to shift the error correction bits 0.5 μm along the y-axis so that the correction field works most reliably when the data field is making a transition.

With the preferred embodiment described above, a probe tip 10 can be located with a line scan 20 μm long with a pixel spacing of 0.5 μm for a total of 40 points. The total size of the structure will be 320 μm×256 μm. If the initial position of the probe tip 10 is known to within this tolerance, then a single line scan will suffice to locate the probe tip. One of skill in the art will recognize that the total size of the structure is merely a matter of design choice and in no way limiting of the present invention.

Figure 11:
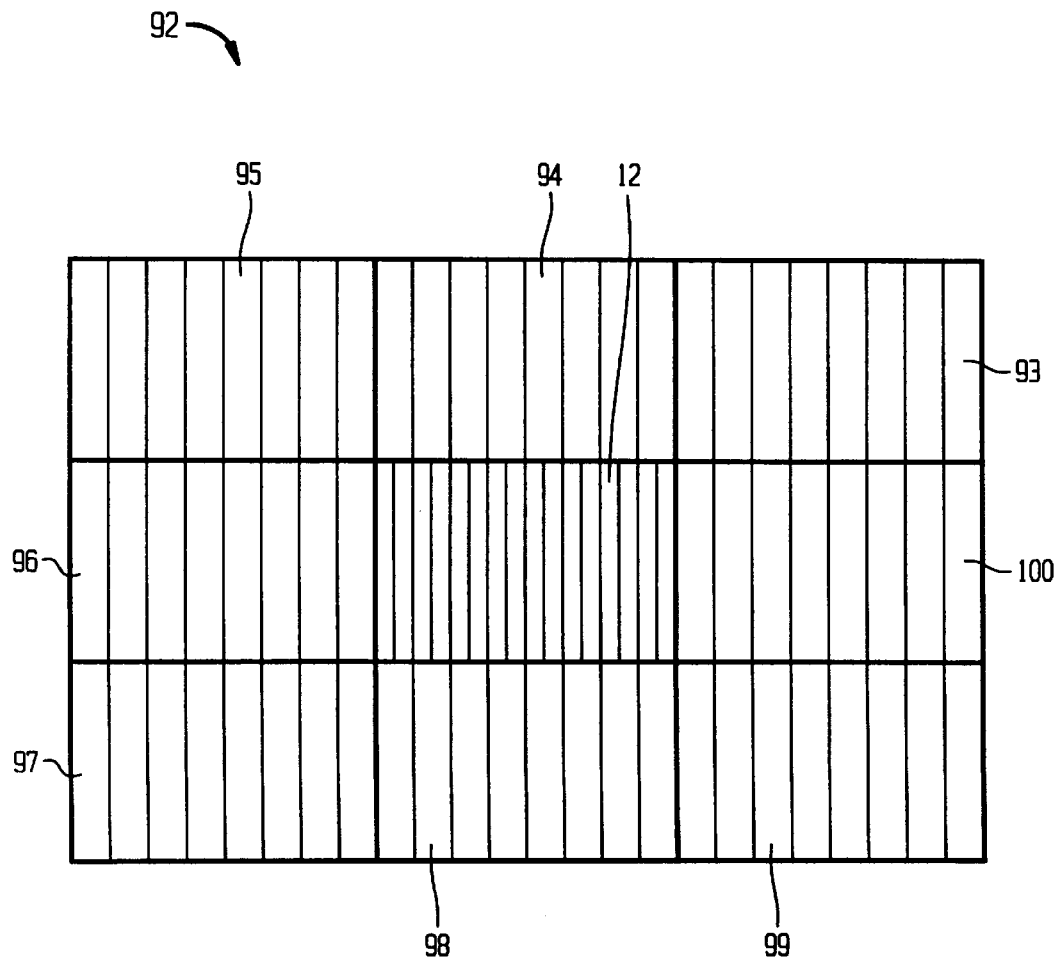
FIG. 11 is a top view of a probe tip locator constructed in accordance with a preferred embodiment of the present invention surrounded on each side by auxiliary locator fields.

As seen in FIG. 11, by surrounding the locator 12 with an auxiliary finder 92 comprising 8 auxiliary fields 93–100, the capture range can be expanded by a factor of 3 or more, though a second line scan would be required if the probe tip 10 initially falls outside the central locator 12. This mechanism can be employed if it is necessary to be certain that the probe tip 12 is located. The auxiliary finder 95 will work equally well with either of the locators described above. The auxiliary fields 93–100 are all the same size as the locator 12. Each is patterned by an array of lines, parallel to the y-axis, having a unique pitch, ranging from 2 $\mu$m up to 20 $\mu$m, the size of the scan. The lines could be 1 $\mu$m wide. The pitch will identify the field so the appropriate shift can be used to move into the locator for a second scan. With the locator in FIG. 6, the auxiliary fields would expand the capture rectangle to 768 $\mu$m×960 $\mu$m. Additional rings of auxiliary locators could also be employed if desired.

In sum, the present invention is directed at two different methods for locating a probe tip when the scan range is smaller than the needed capture range. Encoding of the locator fields permits the use of multiple copies of a locator structure. The first method utilizes the vertex principle using the encoding fields, while the second depends on encoding fields alone. The first is simpler than the second, while the second may offer higher efficiency in use. In both schemes, auxiliary fields can be added to extend the range.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A probe tip locator for use in determining the x-axis location and y-axis location of a probe tip of a microscope relative to a locator, said locator comprising:
    a plurality of first reference lines parallel in a first direction, each of said first reference lines representing a predetermined x-axis location of said probe tip;
    a plurality of sets of parallel encoded bit fields, each one of said sets corresponding to one of said first reference lines; and
    a plurality of second reference lines, each one of said second reference lines intersecting at least one of said first reference lines, such that a scan of a portion of said locator is used to determine the x-axis location and y-axis location of said probe tip relative to said probe tip locator by movement of said probe tip relative to said probe tip locator.

2. The probe tip locator according to claim 1, wherein said second reference lines are parallel in a second direction.

3. The probe tip locator according to claim 1, wherein each one of said second reference lines intersects at least one of said first reference lines at an acute angle.

4. The probe tip locator according to claim 1, wherein each set of said encoded bit fields comprises a plurality of parallel neighboring lines, each one of said plurality of neighboring lines representing either a one or a zero.

5. The probe tip locator according to claim 4, wherein each set of said encoded bit fields comprises four neighboring lines, said four neighboring lines capable of representing sixteen first reference lines representing 16 predetermined x-axis locations.

6. The probe tip locator according to claim 4, wherein said y-axis location is represented by the distance between said first reference line and said intersecting second reference line.

7. The probe tip locator according to claim 4, wherein said neighboring lines are about 0.5 $\mu$m wide and said first reference lines and said second reference lines are about 1 $\mu$m wide.

8. The probe tip locator according to claim 4, further comprising an auxiliary probe tip finder comprising a plurality of third reference lines, each of said reference lines having a unique pitch for identifying which reference line has been scanned.

9. A probe tip locator for use in determining the x-axis location and y-axis location of a probe tip of a microscope relative to a locator, said locator comprising:
    a plurality of parallel reference lines, each of said reference lines representing a predetermined x-axis location of said probe tip;
    a plurality of first sets of parallel encoded bit fields, each one of said first sets corresponding to one of said first reference lines; and
    a plurality of second sets of parallel encoded bit fields parallel to said first sets, each one of said second sets corresponding to a predetermined y-axis location of said probe tip, such that a scan of a portion of said locator is used to determine the x-axis location and y-axis location of said probe tip relative to said probe tip locator by movement of said probe tip relative to said probe tip locator.

10. The probe tip locator according to claim 9, wherein each set of said first and said second sets of encoded bit fields comprises a plurality of parallel neighboring lines, each one of said plurality of neighboring lines representing either a one or a zero.

11. The probe tip locator according to claim 10, wherein each set of said first set of encoded bit fields comprises four neighboring lines, said four neighboring lines capable of representing 16 distinct first reference lines representing 16 predetermined x-axis locations.

12. The probe tip locator according to claim 10, wherein and each set of said second set of encoded bit fields comprises eight neighboring lines, said eight neighboring lines capable of representing 256 predetermined y-axis locations.

13. The probe tip locator according to claim 12, wherein each of said neighboring lines are about 0.5 $\mu$m wide and said reference lines are about 1 $\mu$m wide.

14. The probe tip locator according to claim 12, further comprising a third set of encoded bit fields, said third set of encoded bit fields comprising error correction bits.

15. The probe tip locator according to claim 10, further comprising an auxiliary probe tip finder comprising a plurality of second reference lines, each of said second reference lines having a unique pitch for identifying which reference line has been scanned.

16. A method of determining the x-axis location and y-axis location of a probe tip of a microscope relative to a probe tip locator comprising the steps of:
    (a) positioning a probe tip over a probe tip locator, said locator having a plurality of first reference lines parallel in a first direction, each of said first reference lines representing a predetermined x-axis location of said probe tip; a plurality of sets of parallel encoded bit fields, each set corresponding to one of said first reference lines; and a plurality of second reference lines, each one of said second reference lines intersecting at least one of said first reference lines;
    (b) scanning at least one of said first reference lines, one set of said parallel encoded bit fields and at least one of said second reference lines;

(c) decoding said scanned encoded bits to determine which of said first reference lines was scanned and thereby determining the x-axis location of said probe tip; and (d) determining the y-axis location of said probe tip by measuring the distance between said scanned first reference line and said scanned second reference line.

17. A method of determining the x-axis location and y-axis location of a probe tip of a microscope relative to a probe tip locator comprising the steps of:

(a) positioning a probe tip over a probe tip locator, said locator having a plurality of parallel reference lines, each of said first reference lines representing a predetermined x-axis location of said probe tip; a plurality of first sets of parallel encoded bit fields, each one of said first sets corresponding to one of said reference lines; and a plurality of second sets of parallel encoded bit fields parallel to said first sets, each one of said second sets corresponding to a predetermined y-axis location of said probe tip;

(b) scanning at least one of said first reference lines, at least a portion of one of said first sets of parallel encoded bit fields and at least a portion of one of said second sets of parallel encoded bit fields;

(c) decoding said scanned portion of said first sets of parallel encoded bit fields to determine which of said first reference lines was scanned and thereby determining the x-axis location of said probe tip; and (d) decoding said scanned portion of said second sets of parallel encoded bit fields to determine the y-axis location of said probe tip.

18. A system for determining the x-axis location and y-axis location of a probe tip of a microscope relative to a stage coordinate system comprising:

a probe tip mounted on a microscope;

a probe tip locator comprising a plurality of first reference lines parallel in a first direction, each of said first reference lines representing a predetermined x-axis location of said probe tip; a plurality of sets of parallel encoded bit fields, each one of said sets corresponding to one of said first reference lines; and a plurality of second reference lines, each one of said second reference lines intersecting at least one of said first reference lines;

said locator mounted on a microscope stage, said stage having a stage coordinate system;

such that a scan of a portion of said locator is used to determine the x-axis location and y-axis location of said probe tip relative to said stage coordinate system.

19. The system according to claim 18, wherein each set of said encoded bit fields comprises a plurality of parallel neighboring lines, each one of said plurality of neighboring lines representing either a one or a zero.

20. The system according to claim 19, wherein each set of said encoded bit fields comprises four neighboring lines, said four neighboring lines capable of representing sixteen first reference lines representing 16 predetermined x-axis locations.

21. The system according to claim 19, wherein said y-axis location is represented by the distance between said first reference line and said intersecting second reference line.

22. The system according to claim 19, wherein said neighboring lines are about 0.5 $\mu$m wide and said first reference lines and said second reference lines are about 1 $\mu$m wide.

23. The probe tip locator according to claim 19, further comprising an auxiliary probe tip finder comprising a plurality of third reference lines, each of said reference lines having a unique pitch for identifying which reference line has been scanned.

24. A system for determining the x-axis location and y-axis location of a probe tip of a microscope relative to a stage coordinate system comprising:

a probe tip mounted on a microscope;

a probe tip locator comprising a plurality of parallel reference lines, each of said reference lines representing a predetermined x-axis location of said probe tip; a plurality of first sets of parallel encoded bit fields, each one of said first sets corresponding to one of said first reference lines; and a plurality of second sets of parallel encoded bit fields parallel to said first sets, each one of said second sets corresponding to a predetermined y-axis location of said probe tip;

said locator mounted on a microscope stage, said stage having a stage coordinate system;

such that a scan of a portion of said locator is used to determine the x-axis location and y-axis location of said probe tip relative to said stage coordinate system.

25. The system according to claim 24, wherein each set of said first and said second sets of encoded bit fields comprises a plurality of parallel neighboring lines, each one of said plurality of neighboring lines representing either a one or a zero.

26. The probe tip locator according to claim 24, wherein each set of said first set of encoded bit fields comprises four neighboring lines, said four neighboring lines capable of representing 16 distinct first reference lines representing 16 predetermined x-axis locations.

27. The probe tip locator according to claim 25, wherein and each set of said second set of encoded bit fields comprises eight neighboring lines, said eight neighboring lines capable of representing 256 predetermined y-axis locations.

28. The probe tip locator according to claim 25, wherein each of said neighboring lines are about 0.5 $\mu$m wide and said reference lines are about 1 $\mu$m wide.

29. The probe tip locator according to claim 25, further comprising a third set of encoded bit fields, said third set of encoded bit fields comprising error correction bits.

30. The probe tip locator according to claim 25, further comprising an auxiliary probe tip finder comprising a plurality of second reference lines, each of said second reference lines having a unique pitch for identifying which reference line has been scanned.

31. A system for determining the x-axis location and y-axis location of a probe tip of a microscope relative to a scan actuator comprising:

a probe tip mounted on a microscope, said microscope having a scan actuator;

a probe tip locator comprising a plurality of first reference lines parallel in a first direction, each of said first reference lines representing a predetermined x-axis location of said probe tip; a plurality of sets of parallel encoded bit fields, each one of said sets corresponding to one of said first reference lines; and a plurality of second reference lines, each one of said second reference lines intersecting at least one of said first reference lines;

said locator mounted on a microscope stage;

such that a scan of a portion of said locator is used to determine the x-axis location and y-axis location of said probe tip relative to said scan actuator.

32. A system for determining the x-axis location and y-axis location of a probe tip of a microscope relative to a scan actuator comprising:

a probe tip mounted on a microscope, said microscope having scan actuator;

a probe tip locator comprising a plurality of parallel reference lines, each of said reference lines representing a predetermined x-axis location of said probe tip; a plurality of first sets of parallel encoded bit fields, each one of said first sets corresponding to one of said first reference lines; and a plurality of second sets of parallel encoded bit fields parallel to said first sets, each one of said second sets corresponding to a predetermined y-axis location of said probe tip;

said locator mounted on a microscope stage;

such that a scan of a portion of said locator is used to determine the x-axis location and y-axis location of said probe tip relative to said scan actuator.

* * * * *